US009757909B2

(12) United States Patent
Valembois

(10) Patent No.: US 9,757,909 B2
(45) Date of Patent: Sep. 12, 2017

(54) METHOD OF MANUFACTURING A COMPOSITE PART, AND RESULTING PART

(75) Inventor: Guy Valembois, Toulouse (FR)

(73) Assignee: SKF AEROSPACE FRANCE, Saint Vallier (FR)

( * ) Notice: Subject to any disclaimer, the term of this patent is extended or adjusted under 35 U.S.C. 154(b) by 0 days.

(21) Appl. No.: 13/145,158

(22) PCT Filed: Jan. 21, 2010

(86) PCT No.: PCT/FR2010/050091
§ 371 (c)(1),
(2), (4) Date: Jul. 19, 2011

(87) PCT Pub. No.: WO2010/084286
PCT Pub. Date: Jul. 29, 2010

(65) Prior Publication Data
US 2011/0277919 A1 Nov. 17, 2011

(30) Foreign Application Priority Data

Jan. 21, 2009 (FR) ........................ 09 50362
Feb. 19, 2009 (FR) ........................ 09 51071

(51) Int. Cl.
*B29C 70/72* (2006.01)
*B29C 70/86* (2006.01)
(Continued)

(52) U.S. Cl.
CPC .............. *B29C 70/86* (2013.01); *B29C 70/72* (2013.01); *F16C 7/026* (2013.01);
(Continued)

(58) Field of Classification Search
CPC ......... B29C 65/00; B29C 53/60; B29C 53/66; B29C 53/602; B29C 70/86;
(Continued)

(56) References Cited

U.S. PATENT DOCUMENTS 4,848,957 A * 7/1989 Umeda ...................... 403/374.4
4,851,065 A * 7/1989 Curtz ............................ 156/172
5,683,300 A * 11/1997 Yasui et al. ................... 464/181

FOREIGN PATENT DOCUMENTS

FR 2 152 289 A1 4/1973
GB 2 260 961 A 5/1993
(Continued)

*Primary Examiner* — Vishal I Patel
(74) *Attorney, Agent, or Firm* — Andrew W. Chu; Craft Chu PLLC

(57) ABSTRACT

The invention relates to a method for manufacturing a composite part intended for being subjected, via at least one attachment point, to pulling and/or compression forces. The method includes: winding fibers on a hub so as to form a portion of the wall of the part, and creating an externally convex rounded area at the location intended to form the area for applying the pulling and/or compression forces. The forces are radial thereto. The method also includes placing an insert on the convex rounded area, the insert including the attachment point or a mechanism for rigidly connecting the attachment point, and continuing to wind fibers so as to form the rest of the wall, while covering a portion of the insert and leaving the attachment point or the mechanism for rigidly connecting the attachment point accessible.

12 Claims, 2 Drawing Sheets

(51) Int. Cl.
*F16C 7/02* (2006.01)
*B29L 31/06* (2006.01)

(52) U.S. Cl.
CPC ....... *B29L 2031/06* (2013.01); *F16C 2220/28* (2013.01); *F16C 2300/02* (2013.01)

(58) Field of Classification Search
CPC ... B29C 47/0014; B29C 70/30; B29C 70/347; B29C 70/72; F16C 2220/28; F16C 7/026; F16C 2300/02; B29L 2031/06
USPC .................. 428/343; 442/149; 156/172, 175; 464/181, 182, 183
See application file for complete search history.

(56) References Cited

FOREIGN PATENT DOCUMENTS

WO       2008/066606 A1    6/2008
WO     WO 2008066606 A1 *   6/2008   ............. B29C 70/44

* cited by examiner

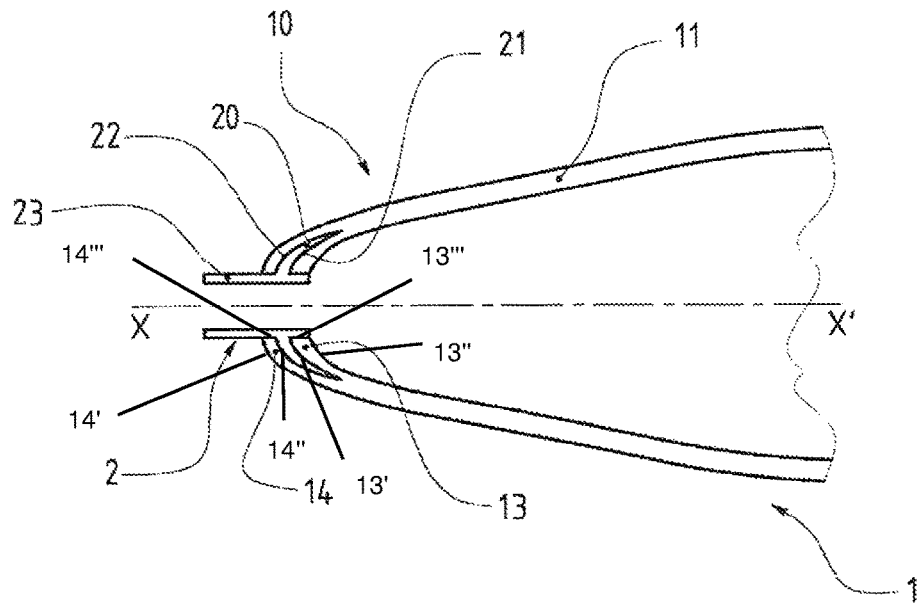
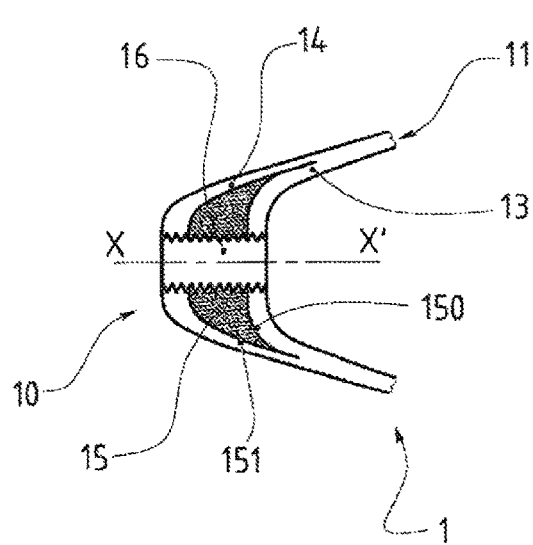
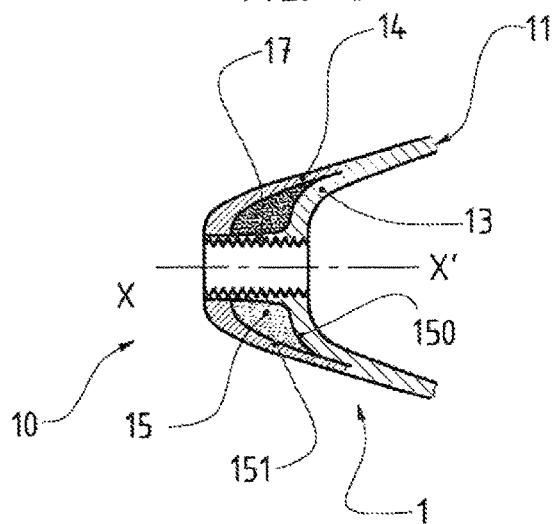

METHOD OF MANUFACTURING A COMPOSITE PART, AND RESULTING PART

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention is related to the field of the parts made out of composite materials, and more in particular the field of the parts intended for being assembled with other parts, and likely to be subjected to pulling and compression forces.

The object of the present invention is thus a method for manufacturing such a part made out of composite material to be subjected, via at least one attachment point, to pulling and compression forces, as well as the resulting part.

The present invention will find a particular application in the field of the manufacture of connecting rods, and is thus also related to a connecting rod manufactured according to the inventive method.

2. Description of Related Art Including Information Disclosed Under 37 CFR 1.97 and 37 CFR 1.98.

It is known that the weak point of the composite materials is the thermoplastic or thermosetting matrix, in which the reinforcing fibers are embedded, and which generally consists of a resin, because it has a specific resistance much lower than that of the fibers. The way of ruining a part made out of composite material is generally a breaking of the resin connecting the fibers.

A good design of a composite part takes this phenomenon into consideration and favors a transmission of the forces through putting the fibers purely under a pulling or compression force, which results into not stressing the resin. Thus, the composite material is formed of layers of fibers oriented according to the direction of said forces or according to directions close to the latter.

This can easily be achieved at the level of the main portion of the part when the shapes are simple and the direction of the forces is under control, it is however difficult at the level of the areas of connection to one or several other parts, namely the areas in which the pulling or compression force is exerted.

Generally, such a connection area includes an insert provided with a connecting means permitting to carry out the connection and the transmission of the forces into the part, but the placing of such inserts is particular difficult, namely when the forces vary during the utilization of said composite part.

The main drawback is thus at the level of the junction of the body of the composite part with the insert, and is related to the transmission of the force between them.

In order to cope with this drawback, there has been provided, namely in FR 2 125 289, a force-transmitting organ, such as a connecting rod, made out of fiber-reinforced synthetic material. This organ comprises a tubular central body containing fibers oriented according to a direction in which the forces are exerted, and the ends of which are narrowed into a truncated shape in order to make integral with each of them a connecting means, which is formed of two parts, an internal one and an external one, so as to be capable of enclosing the narrowed portion of the tubular central body.

However, this force-transmitting organ only partially copes with the problems of connecting the body of the composite part with the insert, and problems of strength and resistance in time persist.

SUMMARY OF THE INVENTION

The aim of the present invention is to provide a method for manufacturing a part made out of composite material aimed at being subjected, via at least one attachment point, to pulling and/or compression forces, which permits to cope with the various above-mentioned drawbacks.

The method for manufacturing a composite part aimed at being subjected, via at least one attachment point, to pulling and/or compression forces, and formed of reinforcing fibers oriented according to the direction of said forces or according to directions close to same, and embedded in a matrix, is characterized in that it consists in performing the following operations:

winding fibers on a hub so as to form a portion of the wall of said part, and creating, at the location aimed at forming the area for applying the pulling and/or compression forces, an externally convex rounded area, which the direction of said forces is radial to, placing on said convex rounded area an insert, which comprises said attachment point or a means for making integral with said attachment point, and continuing to wind fibers so as to form the rest of said wall, while covering a portion of said insert and while leaving accessible said attachment point or said means for making integral with said attachment point.

According to an additional feature of the inventive method, the insert used includes a portion having a concave face aimed at being joined to the rounded area, and a convex face aimed at being covered during the forming of the rest of the wall.

It should be noted that preferably, but not restrictively, the curvatures of the concave and convex faces of the insert have a constant radius, so that the resting planes have, depending on the geometry of the part to be manufactured, a semi-cylindrical or semi-spherical shape, or a partly cylindrical or partly spherical shape.

Advantageously, the insert can be made out of a composite material, eventually identical to that of which the wall of the part is made.

According to an additional feature of the inventive method, since the insert and the wall of the part are made based on a thermoplastic matrix, a fusion of said insert (2) and said wall is finally carried out.

According to a variant of the method, the placing of the insert is replaced by creating an insert in situ through coiling fibers in excess.

According to an additional feature of the inventive method, the coiling in excess is mainly carried out according to directions different from those for winding fibers for forming the wall.

According to an additional feature of the inventive method, the coiling in excess is carried out through winding coaxially to the axis according to which the pulling and/or compression forces are exerted.

Using composite materials permits to manufacture strong and light connecting rods. A composite tube can advantageously have a pulling, compression and bending strength provided that it is mainly comprised of fibers with high mechanical characteristics and the orientation of which is close to the axial direction. Such a positioning of the fibers can occur on a mandrel through filament winding of the composite fiber.

However, the weakness of such a connecting rod resides in the assembling of the so formed tube with the connecting means arranged at the ends of the connecting rod. The connection between the tube and these end parts let appear stress modes that are ill-supported by the composite material, in particular when it is formed of one-directional fibers.

The present invention copes with this drawback, and permits to design connecting rods made of composite materials, whether it is tubular or not, and which includes two attachment points connected by a body made out of composite material.

The advantages and features of the method according to the invention will become clear from the following description, which refers to the attached drawings, which represent several non-restrictive embodiments of same.

BRIEF DESCRIPTION OF THE DRAWINGS

FIG. 1 represents a schematic partial cross-sectional view of a composite part achieved by the method according to the invention.

FIGS. 2a and 2b represent schematic partial cross-sectional views of the same composite part.

DETAILED DESCRIPTION OF THE DRAWINGS

Figure 3A:
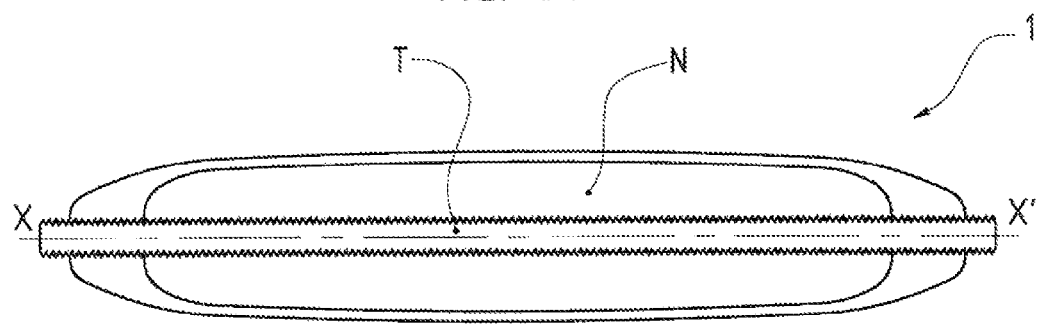
FIGS. 3a, 3b and 3c represent schematic partial cross-sectional views showing variants of implementation of the method according to the invention.

When referring now to FIG. 1, one can see the end 10 of a part 1 made out of composite material manufactured according to the inventive method. This end is aimed at being provided with an attachment point, in order to be capable of subjecting the part 1 to pulling and/or compression forces. The part 1 consists in this case, but not restrictively, of a connecting rod.

The part 1 comprises a tubular wall 11 formed of fibers and resin, and its end 10 includes an insert 2, embedded in the thickness of the wall 11.

The insert 2 includes, on the one hand, a bowl-shaped portion 20, comprising a concave inner face 21, a convex outer face 22 and, on the other hand, an axial shaft 23 aimed at permitting the fixing of securing means.

At the level of the end 10 of the part 1, the tubular wall 11 is divided into two layers, one inner layer 13 and one outer layer 14, between which the insert 2 is inserted.

The inner layer 13, having a first outer surface 13', a first inner surface 13", and a first attachment end surface 13'" orthogonal to a set direction, matches the shape of the concave inner face 21, and the fibers passing through it are parallel to the latter.

Likewise, the outer layer 14, having a second outer surface 14', a second inner surface 14", and a second attachment end surface 14'" orthogonal to a set direction, matches the shape of the convex outer face 22, and the fibers passing through it are parallel to the latter.

Under pulling the force is made between the outer layer 14 and the convex outer face 22, while under compression the force is made between the inner layer 13 and the concave inner face 21.

The part 1 is obtained through the inventive manufacturing method, i.e. fibers are wound so as to form the tubular wall 11 and the end 10, e.g. using a core, in a first time until forming the inner layer 13. Then the insert 2 is placed, the concave inner face 21 of its portion 20 being joined to the inner layer 13, which has a rounded shape at the level of the end 10, then the winding of fibers is continued so as to form the rest of the tubular wall 11 and the outer layer 14, by covering the convex outer face 22 of the portion 20 of the insert 2, while leaving the axial shaft 23 accessible, in order to be able to fix a securing means, not shown.

The insert 2 can be made out of metal, or of a composite material, eventually identical to that, which the tubular wall 11 is made of. In the case of a thermoplastic matrix, it is possible to finally obtain a fusion of the insert 2 and the wall 11.

When referring now to FIGS. 2a and 2b, one can see variants of the invention, in which the insert is created during the manufacturing of the part.

In these figures can be seen the tubular wall 11 and its inner 13 and outer 14 layers, wherein each of which have a rounded shape, while the insert is replaced by an extra quantity 15 of material arranged between these inner 13 and outer 14 layers.

The means for fixing the securing means is filled with a threaded hole 16, obtained by previously and temporarily placing a threaded rod, not shown, and essentially made in the extra quantity 15 of material, as shown in FIG. 2a, or only in the inner layer 13, as shown in FIG. 2b.

As regards the embodiment of FIG. 2b, during the forming of the inner layer 13, one proceeds to winding fibers on the threaded rod of the core, not shown, so as to create, simultaneously with the inner layer 13, a threaded shaft 17, around which the extra quantity 15 of material will be created.

The extra quantity 15 can consist of an excess coiling of fibers, after forming the inner layer 13, by winding in directions different from those in which are wound the fibers for forming the tubular wall 11, for example coaxially to the axis XX' of the part 11.

The extra quantity 15 cooperates with the fibers of the wall 11, in the same way as the insert 2, it also includes a concave inner face 150 and a convex outer face 151.

Figure 3B:
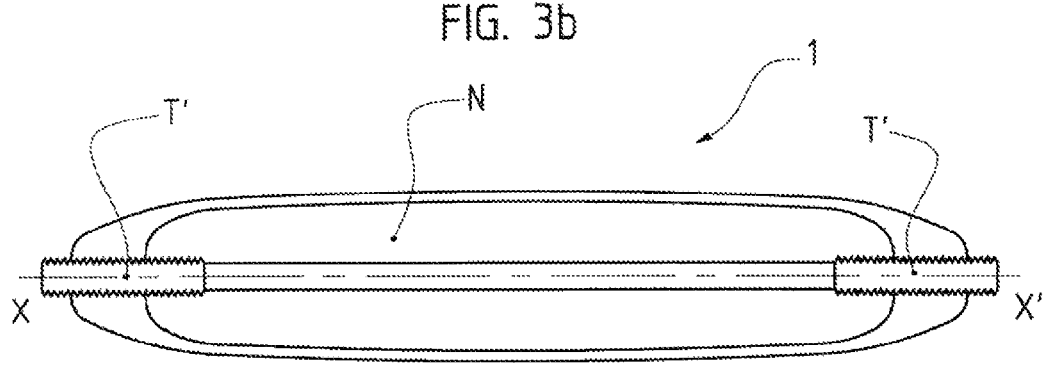
Figure 3C:
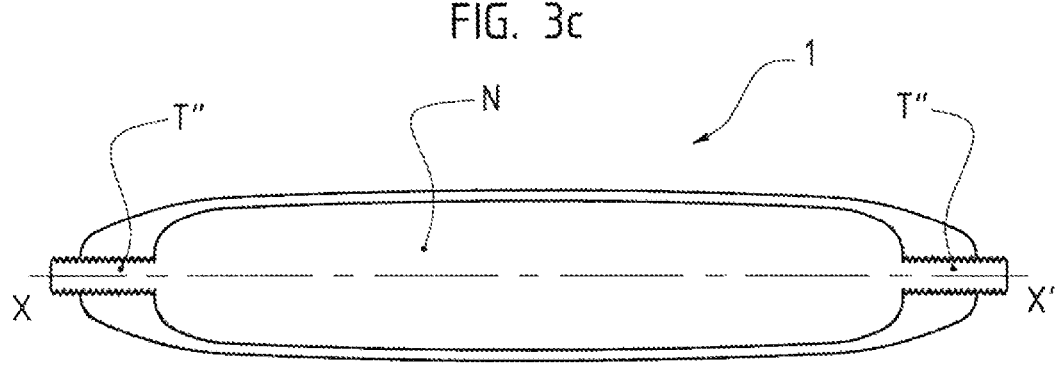

When referring to FIGS. 3a, 3b and 3c, one can see examples of cores likely to be used for manufacturing a part 1.

In FIG. 3a is used a fusible core N through which axially passes a threaded rod T, in FIG. 3b is used a fusible core N provided at each of its ends with a threaded rod T', while in FIG. 3c is used a core N that includes, from its manufacturing, at each of its ends an excrescence T" in the form of a threaded rod.

It should be noted that the core N can be made out of wax or preferably out of metal with a low melting point, while the threaded rods T and T' are preferably polished and waxed.

Of course, in the various above-mentioned methods, when we talk about winding fibers, it should be understood that the latter are embedded in a thermoplastic or thermosetting matrix, eventually by being pre-impregnated.

It should be noted that, according to the method, it is possible to carry out a polymerization between each winding operation, or only one polymerization after the last winding operation, this also depending on the nature of the matrix used.

I claim:

1. A method for manufacturing a composite part, the method comprising the steps of:

forming a wall by winding fibers on a hub so as to form a wall in a set direction;
forming a first end portion by winding said fibers on an end of said hub, said first end portion having a first externally convex rounded area comprised of a first outer surface, a first inner surface, and a first attachment end surface orthogonal to said set direction,
wherein a first group of said fibers are wound in a orthogonal direction to said set direction along said first attachment end surface to a first height;
placing an insert on said first end portion, said insert having an attachment point surface, said first attachment end surface being aligned with said attachment point so as to form a continuous attachment surface;
forming a second end portion by winding said fibers over at least a portion of said insert, said second end portion having a second externally convex rounded area comprised of a second outer surface, a second inner surface, and a second attachment end surface orthogonal to said set direction,
wherein a second group of said fibers are wound in a orthogonal direction to said set direction along said second attachment end surface to a second height, and
wherein said second attachment end surface aligns with said continuous attachment surface, said continuous attachment surface being comprised of said first attachment surface, said attachment point surface, and said second attachment surface; and
embedding said fibers in a matrix.

2. The method for manufacturing a composite part, according to claim 1, said first height corresponding to thickness of said first end portion and an angle of curvature of said first end portion being externally convex.

3. The method for manufacturing a composite part, according to claim 2, said thickness of said first end portion being equal to a thickness of said first attachment end surface.

4. The method for manufacturing a composite part, according to claim 1, said second height corresponding to said first height.

5. The method for manufacturing a composite part, according to claim 4, wherein thickness of said second attachment end surface is equal to said thickness of said first attachment end surface.

6. The method for manufacturing a composite part, according to claim 1, wherein said at least a portion of said insert comprises a concave face joined to said first outer surface of said first end portion and a convex face joined to said second inner surface of said second end portion.

7. The method for manufacturing a composite part, according to claim 6, wherein said concave face has a first constant radius of curvature, wherein said convex face has a second constant radius of curvature, and wherein said first constant radius of curvature is generally identical to said second constant radius of curvature.

8. The method for manufacturing a composite part, according to claim 1, wherein said insert is comprised of another composite material, said another composite material being comprised of insert fibers and an insert matrix, wherein said insert fibers are generally identical to said fibers, and wherein said insert matrix is generally identical to said matrix.

9. The method for manufacturing a composite part, according to claim 8, wherein said insert matrix is a thermoplastic resin, and wherein said matrix is a thermoplastic resin, the method further comprising the step of:
fusing said insert with said wall.

10. The method for manufacturing a composite part, according to claim 1, wherein the step of placing said insert on said first end portion comprises the steps of:
winding additional fibers in another set direction so as to form said attachment point surface with said additional fibers.

11. The method for manufacturing a composite part, according to claim 10, wherein said another set direction is different from said set direction.

12. The method for manufacturing a composite part, according to claim 10, wherein said another set direction is generally identical to said set direction.

* * * * *